United States Patent [19]
Klein

[11] 4,305,068
[45] Dec. 8, 1981

[54] DETECTOR SYSTEM

[76] Inventor: William T. Klein, 33 Valley Ave., Locust Valley, N.Y. 11560

[21] Appl. No.: 119,442

[22] Filed: Feb. 7, 1980

[51] Int. Cl.³ .............................................. G08B 21/00
[52] U.S. Cl. ...................................... 340/605; 73/40; 340/620
[58] Field of Search ............... 340/618, 603, 605, 606, 340/611, 612, 614, 626, 627, 620; 73/40, 40.5 R, 49.1, 49.2

[56] References Cited

U.S. PATENT DOCUMENTS

| | | | |
|---|---|---|---|
| 358,949 | 3/1887 | Stern | 340/605 |
| 3,505,820 | 4/1970 | Draper et al. | 73/40 X |
| 3,753,257 | 8/1973 | Arnold | 340/627 |
| 3,868,664 | 2/1975 | Hill | 340/620 |
| 3,995,472 | 12/1976 | Murray | 73/40 |

FOREIGN PATENT DOCUMENTS

| | | | |
|---|---|---|---|
| 1200619 | 9/1965 | Fed. Rep. of Germany | 73/40.5 R |
| 1271602 | 6/1968 | Fed. Rep. of Germany | 340/605 |
| 1284757 | 12/1968 | Fed. Rep. of Germany | 340/605 |
| 1294118 | 4/1969 | Fed. Rep. of Germany | 340/605 |
| 2110467 | 9/1972 | Fed. Rep. of Germany | 340/605 |

*Primary Examiner*—John W. Caldwell, Sr.
*Assistant Examiner*—Daniel Myer
*Attorney, Agent, or Firm*—Kane, Dalsimer, Kane, Sullivan and Kurucz

[57] ABSTRACT

A detector system for detecting leaks in tanks and pipelines which includes a sensor containing a fluid with said sensor degradable on contact with the liquid, gas or vapor which is being monitored wherein when said sensor degrades the fluid flows therefrom with a reduction in the fluid level causing activation of an alarm system.

12 Claims, 6 Drawing Figures

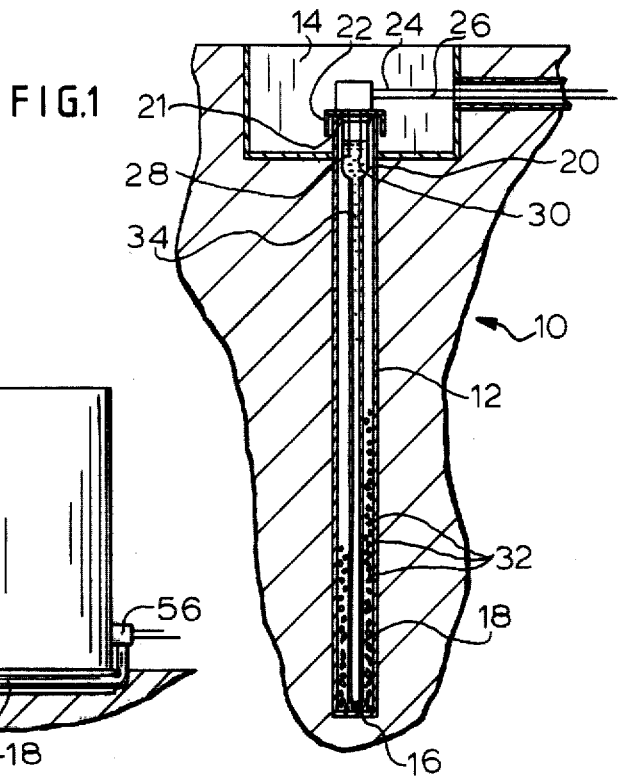
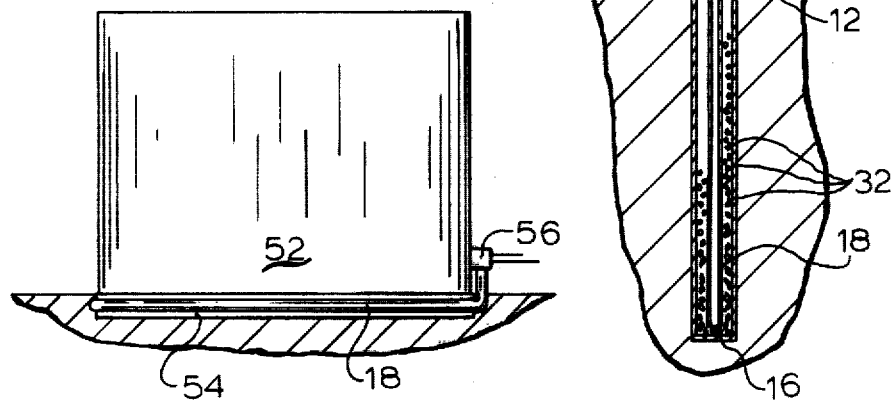
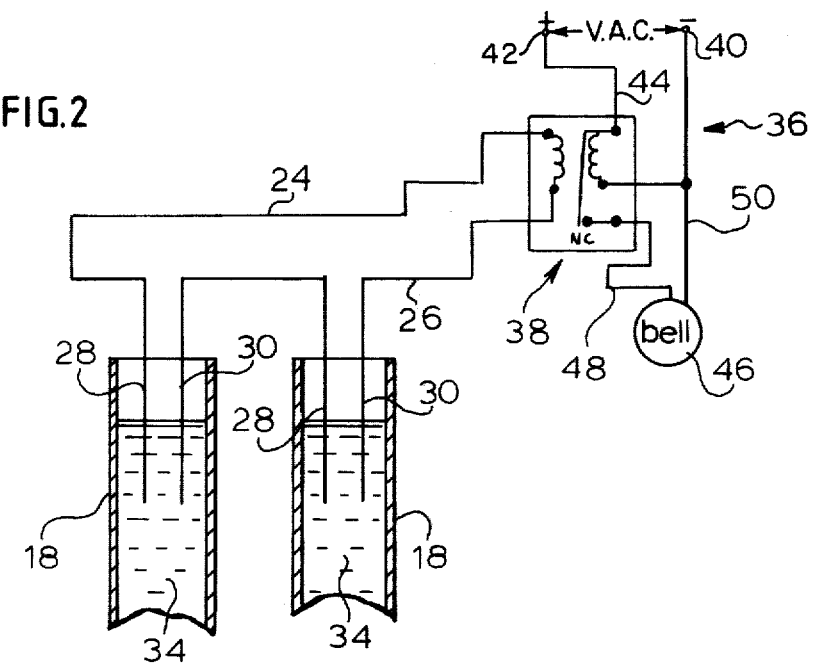

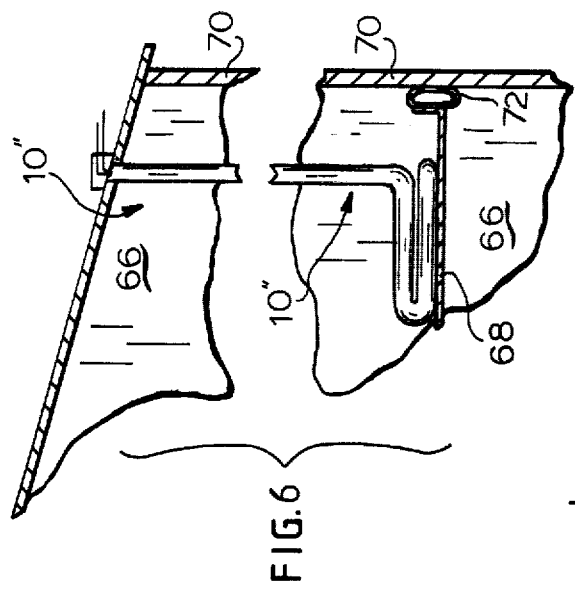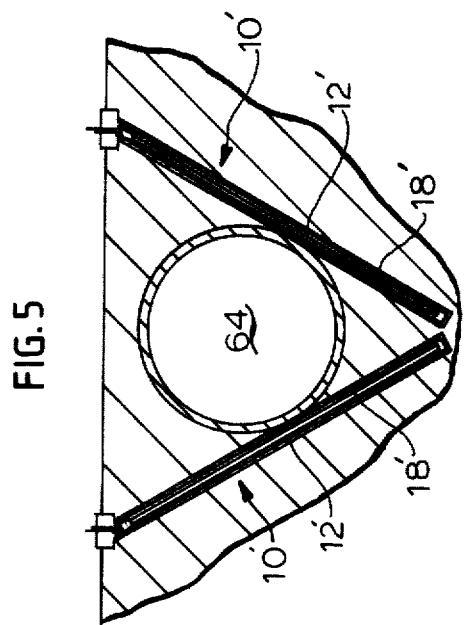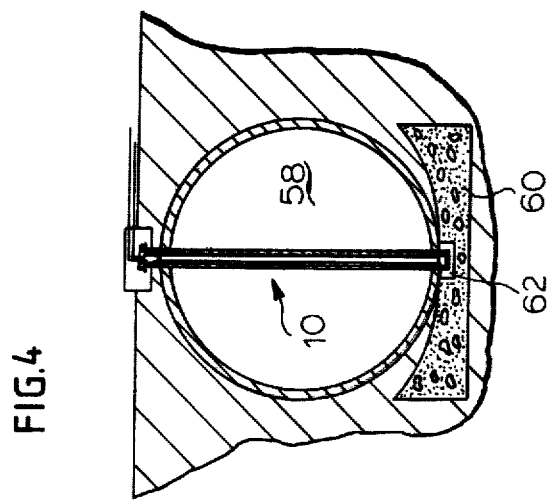

DETECTOR SYSTEM

FIELD OF THE INVENTION

The present invention relates to a leak detector device for monitoring leaks in tanks, pipelines and other container vessels.

BACKGROUND OF THE INVENTION

With ever increasing concern for public safety and protection of the environment, it has become desirable, if not essential, that leaks in tanks, pipelines or other containers containing material such as hazardous chemicals, petroleum etc., be immediately detected. This would apply to underground tanks or pipelines, which are not accessible or visible, as well as tanks and pipelines above the surface, so that when leakage occurs the immediate safety measures may be taken.

Heretofore, a number of detection systems have been proposed, such as, U.S. Pat. Nos. 3,564,526, granted Feb. 16, 1971 and 3,995,472, granted Dec. 7, 1976. The first of these patents utilizes a pair of insulated conductors adjacent a buried pipeline, with the leaking material causing a degrading of the insulation and thus a short circuit of the conductors, which activates an alarm. Not only does this system require two insulated conductors throughout the length of the sensor, which is expensive, but should a break exist in one of the sensors between the leakage and the monitor, the system would be ineffective. In addition, it may be undesirable in many applications to have a short circuit between conductors amid the leaking material.

The second of these patents utilizes a degradable pneumatic sensor coupled with a monitor. The sensor is pressurized with the leaking material causing the sensor to degrade resulting in a pressure loss which is sensed by the monitor thereby indicating a leak. While this system may have increased application than the first mentioned, it still requires the maintenance of a pneumatically pressurized sensor which is expensive and which may be difficult to effectively maintain, especially in long sensor applications, which may reduce the reliability of the system and increasing the occurrences of false alarm.

SUMMARY OF THE INVENTION

Accordingly, the present invention eliminates the short comings of the prior systems and provides for effective monitoring of material such as liquids, vapors and gas within a tank or pipeline or other container vessel. The system provides for a means of leak detection which is relatively simple and inexpensive, while being safe and reliable in the monitoring of leakage in a wide range of application.

The system basically includes a closed end tube made of a material that degrades in the presence of the material being monitored. The tube is filled with a fluid and two electrodes are placed in the tube's open end in contact with the fluid. The electrodes exist in a complementary circuit which is in an operative relation with an alarm. As long as the fluid is maintained in the tube, a complete circuit exists which inhibits activating the alarm. When leakage occurs in the presence of the tube, the tube degrades and the level of the fluid inside the tube falls, breaking the circuit and causing the alarm to sound.

Through the present system the aforenoted advantages, in addition to those that will become apparent from the following detailed description taken in conjunction with the accompanying drawings, will be realized:

BRIEF DESCRIPTION OF THE DRAWINGS

FIG. 1 is a partially sectional view of the leak detector constructed in accordance with the present invention.

FIG. 2 is a schematic diagram of the leak detector circuit.

FIG. 3 is a perspective view of a leak detector located about the perimeter of a concrete slab supporting a tank.

FIG. 4 is a partially sectional view of the leak detector used adjacent a sub-surface tank with a portion extending through a well in the concave concrete base supporting the tank.

FIG. 5 is a partially sectional view of the leak detector located in wells angled downward adjacent a sub-surface tank or pipeline.

FIG. 6 is a sectional view of the leak detector located in a tank having a floating head.

DETAILED DESCRIPTION OF THE DRAWINGS

In the drawings, a leak detector 10 is provided and shown in FIG. 1 disposed in a sub-surface well 12. If so desired, adjacent the surface, a manhole area 14 may be provided so as to readily access the leak detector. The detector 10 includes a closed end 16 degradable tube 18 having its open end terminating in a reservoir 20. The tube may be maintained in the well by way of a support 21 attached at the reservoir end which serves to abut the open end of the well 12 and maintain the tube 18 in a hanging relationship with said well. A cap 22 is provided over the open end of the well 12 and allows wires 24 and 26 to pass therethrough connecting to electrodes 28 and 30, which are positioned in the reservoir 20.

While only one well 12 and detector 10 is shown, depending on the application as will later be seen, a number of detectors may be utilized and placed about the perimeter of the area to be monitored, perhaps about a sub-surface tank or pipeline and should extend far enough below the ground water line so that any leakage that occurs would flow at that level, thereby enabling it to contact the detector. The well should also allow this sub-surface material to pass through and contact the degradable tube 18, and this is provided for by the screened openings 32. If so desired, the well may comprise a standard PVC perforated piping and can be as small as one inch in diameter. Because of the versatility of the detector size, it may readily be incorporated in many existing installations without the necessity of elaborate excavation and may usually be accomplished by way of hand held tools. Of course the size of the degradable tube 18 should be of a diameter so as to allow its insertion into the well. This of course will vary with each application as desired.

The degradable tubing 18 should be made of material so as to degrade in the presence of the material for which the leakage is being monitored. For example, if gasoline or oil leakage is being monitored, the material for the tube should degrade in the presence of hydrocarbons. In other applications, the material may be chosen accordingly adding to the versatility of the present system.

Placed in the tube is a sufficient amount of fluid 34 to connect electrodes 28 and 30, which would be partially submerged therein. In the colder regions, this fluid could contain sufficient amounts of antifreeze to prevent its freezing and allow for year round monitoring. The expense for this fluid is nearly negligible as compared to the cost of a copper conductor or a pressurized system, and in the warmer climates, its cost is all but eliminated since the use of a fluid such as water is sufficient to enable operation of the system.

As shown in FIG. 2, the wires 24 and 26 serve to connect a plurality of detectors to switch 38 which is in an alarm circuit 36 providing a complete circuit therebetween. A positive terminal 42 connects with switch 38 via line 44. Switch 38 in turn connects with an alarm 46 via lines 48 and 50 with line 50 providing connection with negative terminal 40 thereby providing for an operative circuit to activate the alarm 46 when the switch 38 is closed.

Depending upon its application, it may be desired that the circuit be of the intrinsically safe type; that being incapable of releasing sufficient electrical or thermal energy to cause ingition of hazardous atmospheric mixtures. This may be accomplished through the use of an intrinsically safe switch of the type manufactured by Delaval, Gems Sensor Division, Farmington, Conn. 06032, under the name Safe-Pak, if so desired.

In operation of the circuit, when the switch 38 is in its normally closed position as shown, the power supply is in a complete circle with the alarm, activating it thereby indicating a leak. However, while a current path exists through wires 24 and 26, the switch 38 is held open, disconnecting the alarm. When the leakage contacts the tube 18 causing it to degrade, the fluid 34 flows from the tube, decreasing the level in the reservoir thereby exposing the electrodes 28 and 30 which breaks the circuit therebetween. No current now exists in the wires 24 and 26 which causes the switch 38 to close, sounding the alarm, indicating that leakage has occured at which time appropriate steps may be taken.

Should the current in the wires 24 and 26 for any other reason cease i.e., faulty wiring etc, the switch will automatically close, sounding the alarm. If the fluid levels in the detectors are proper, this would indicate a fault in the system, thereby providing a fail safe feature which would indicate an inoperative system.

From the foregoing description of the leak detection system of the present invention, it is apparent that it may be used in numerous applications and may be readily modified as necessary. FIGS. 3 through 6 serve to illustrate the various application that the present system may be utilized in, however, it should be understood that these are by no means considered exclusive. With regard particularly to FIG. 3, there is shown an above ground tank 52, supported by a concrete slab 54, having the degradable tube 18 about the perimeter of the base. An electrical box 56 is provided and contains the reservoir 20 and the electrodes 28 and 30 in an arrangement as aforementioned. The electrical box may also contain the alarm circuit and power supply or may alternatively be connected to an alarm a distance therefrom by way of conventional wiring. As is evident, any leakage from the tank will inevitably drained over the perimeter of the base, degrading the tube thereby activating the alarm in the same manner as aforementioned with regard to FIGS. 1 and 2.

Turning now to FIG. 4, there is depicted a detector 10 located about a sub-surface tank 58, with said tank resting on a concave base 60 having a centrally located base well 62. Again, the detector arrangement is similar to that discussed with regard to FIGS. 1 and 2, except that the position of the degradable tubing 18 is located in the base well 62. Any leakage that occurs from the tank will drain into the base well 62, causing the tube to degrade, activating the alarm as aforementioned. While the system would work with a single detector 10 located at the end of the tank, it is desired for more effective operation that two detectors be utilized, one at each end of the tank having a common degradable tubing utilized by both running the length of the base well 62. If it is so desired, an alternate system may include two detectors, one located at each end of the tank, with each having a single closed end degradable tubing having a portion in the base well 62.

With regard now to FIG. 5, there is shown a sub-surface tank or pipeline 64, having two wells 12' shown on either side of the tank, angling downward towards each other to meet at a point. A detector 10' is placed in each of the wells 12' and appropriate wiring would be connected thereto as discussed with regard to FIGS. 1 and 2. As is readily apparent, any leakage of material from the tank or pipeline, would pass through the holes in the wells 12' and contact the degradable tubing 18', causing it to degrade thereby reducing the fluid level and activating the alarm as aforementioned.

In FIG. 6 there is illustrated a detector 10" utilized in a tank 66 having a floating head 68 which rides upon the material being stored therein. The head 68 is in a bearing relationship with the tank wall 70 via gasket 72. This embodiment of the detector 10" is operative in the same manner as previously discussed with regard to the prior embodiments, however, since the head is of a movable nature, it is desirable that the degradable tube 18 be flexible in character so that it may readily adapt to the position of the head 68 as it moves, and be of sufficient length that it is in continual contact with said head so as to monitor any leakage of material passed the gasket 72.

It should be noted that while the aforementioned embodiments utilize two electrodes to monitor the fluid level in the degradable tube, other means for indicating the level of the fluid, such as a float coupled with a switch, may also be utilized and is contemplated within the spirit of the invention. Also, in general, while a preferred embodiment of the device has been disclosed and discussed in detail herein, it should be understood that its scope should not be limited thereby, rather its scope should be determined by that of the appended claims.

What is claimed is:

1. A detector system for use in monitoring material such as liquid, gas, or vapors when in a container, including:
    a detector means in operative association with said container, said means comprising: a tube capable of retaining a liquid at a predetermined level therein, said tube being sensitive to said material;
    an indicating means capable of giving an indication when said liquid goes below the predetermined level; and
    wherein, in operation, liquid is normally maintained in said tube at said predetermined level and contact between said material and said tube allows liquid to leave said tube with a lessening of the level of liquid in the tube below the predetermined level indicated by said indicating means.

2. The system in accordance with claim 1 which further includes an alarm system and said indicating means coupled therewith comprises two electrodes in contact with the liquid with said liquid completing a circuit therebetween and wherein a reduction in the liquid level below the predetermined level severs said circuit which activates the alarm system.

3. The system in accordance with claim 2 which includes a container for said material and said container is a tank.

4. The system in accordance with claim 2 which includes a container for said material and said container is a pipeline.

5. The system in accordance with claim 3 wherein said tank is elongated and is buried and includes at least two detector means with at least one tube disposed under said tank.

6. The system in accordance with claim 3 wherein said tank is disposed on a supporting structure and said tube is disposed about at least a portion of the perimeter of said structure.

7. The system in accordance with claim 3 wherein said tank has a floating head capable of moving through a predetermined path and a portion of said tube is in contact with said head and is capable of maintaining said contact as said head moves through the predetermined path.

8. The system in accordance with claim 3 or 4 wherein said container has at least two opposing sides and is buried, said system further includes at least two detector means, one detector means located adjacent each opposite side of said container, each detector means having a portion of its tube which angles downward and towards the other detecting means.

9. The system in accordance with claim 8 which further includes having a portion of the respective tubes for each detector means disposed in protective wells.

10. The system in accordance with claim 9 wherein said well comprises perforated PVC piping.

11. The system in accordance with claims 1, 2, 3, 4, 5, or 6 which includes a protective well with a portion of said tube disposed in said well.

12. The system in accordance with claim 11 wherein said well comprises perforated PVC piping.

* * * * *